United States Patent
Schultheis

(10) Patent No.: US 10,182,482 B2
(45) Date of Patent: Jan. 15, 2019

(54) LAMP KIT FOR INSTALLATION IN A MOTOR VEHICLE, AND A MOTOR VEHICLE

(71) Applicant: CUSTOM LIGHTS UG, Lörrach (DE)

(72) Inventor: Hanno Michael Schultheis, Lörrach (DE)

(73) Assignee: CUSTOM LIGHTS UG, Lörrach (DE)

( * ) Notice: Subject to any disclaimer, the term of this patent is extended or adjusted under 35 U.S.C. 154(b) by 34 days.

(21) Appl. No.: 15/348,224

(22) Filed: Nov. 10, 2016

(65) Prior Publication Data

US 2017/0142800 A1 May 18, 2017

(30) Foreign Application Priority Data

Nov. 13, 2015 (DE) .......................... 10 2015 119 632

(51) Int. Cl.
*H05B 33/08* (2006.01)
*F21S 41/125* (2018.01)
(Continued)

(52) U.S. Cl.
CPC ....... *H05B 33/0857* (2013.01); *B60Q 1/1407* (2013.01); *B60Q 1/18* (2013.01);
(Continued)

(58) Field of Classification Search
CPC ............ H05B 37/0272; H05B 33/0854; H05B 33/0845; F21S 48/1154; F21S 48/115; H04W 4/008; H04W 4/18; H04W 8/22
(Continued)

(56) References Cited

U.S. PATENT DOCUMENTS 5,614,788 A * 3/1997 Mullins .................. B60Q 1/143
307/10.8
2005/0248283 A1* 11/2005 Oyaski ..................... B60Q 1/04
315/82
(Continued)

FOREIGN PATENT DOCUMENTS

DE      101 18 687 A1    10/2002
DE      103 03 430 A1     8/2003
(Continued)

OTHER PUBLICATIONS

Examination Report dated Jul. 22, 2016 issued in corresponding German application No. 10 2015 119 632.8.

*Primary Examiner* — Douglas W Owens
*Assistant Examiner* — Amy X Yang
(74) *Attorney, Agent, or Firm* — Bacon & Thomas, PLLC

(57) ABSTRACT

A lamp kit, preferably a headlamp kit, for the installation in a motor vehicle, comprising at least two headlamps (1, 11), preferably two front headlamps,
wherein the lamp kit comprises at least two light sources (3, 13) for installation in one each of the two lamps (1, 11),
wherein each of the two light sources (3, 13) can emit light in at least one first or one second wavelength, wherein the first of the at least two multicolored light sources (13) is or can be connected to a first control unit (14) for controlling the wavelength of the light emitted by the first light source,
wherein the first control unit is or can be connected to a first receiving unit for receiving a wirelessly transmitted signal, and
the second of the at least two multicolored light sources (3) is or can be connected to a second control unit (4) for controlling the wavelength of the light emitted by the second light source, (Continued)

wherein the second control unit (4) is or can be connected to a second receiving unit for receiving a wirelessly transmitted signal;
and an arrangement (10) with at least two headlamps (1, 11) of a motor vehicle, and a motor vehicle.

8 Claims, 4 Drawing Sheets

(51) Int. Cl.
| | | |
|---|---|---|
| *F21S 41/141* | (2018.01) | |
| *H04W 4/80* | (2018.01) | |
| *B60Q 1/14* | (2006.01) | |
| *B60Q 1/18* | (2006.01) | |
| *B60Q 1/48* | (2006.01) | |
| *H04L 29/08* | (2006.01) | |
| *H05B 37/02* | (2006.01) | |
| *B60Q 1/26* | (2006.01) | |
| *B60Q 1/28* | (2006.01) | |
| *F21Y 115/10* | (2016.01) | |
| *H04W 84/12* | (2009.01) | |
| *H04W 88/08* | (2009.01) | |

(52) U.S. Cl.
CPC ............ *B60Q 1/2607* (2013.01); *B60Q 1/28* (2013.01); *B60Q 1/486* (2013.01); *F21S 41/125* (2018.01); *F21S 41/141* (2018.01); *H04L 67/02* (2013.01); *H04W 4/80* (2018.02); *H05B 33/0845* (2013.01); *H05B 33/0863* (2013.01); *H05B 37/0272* (2013.01); *B60Q 2400/30* (2013.01); *B60Q 2900/10* (2013.01); *B60Q 2900/30* (2013.01); *F21Y 2115/10* (2016.08); *H04W 84/12* (2013.01); *H04W 88/08* (2013.01)

(58) Field of Classification Search
USPC .......................................................... 315/77
See application file for complete search history.

(56) References Cited

U.S. PATENT DOCUMENTS

| | | | | |
|---|---|---|---|---|
| 2011/0006684 | A1* | 1/2011 | Hodgson ............. | H05K 1/0284 |
| | | | | 315/77 |
| 2012/0040606 | A1* | 2/2012 | Verfuerth ........... | H05B 37/0218 |
| | | | | 455/7 |
| 2012/0256543 | A1* | 10/2012 | Marcove ............. | B60Q 1/2607 |
| | | | | 315/77 |

FOREIGN PATENT DOCUMENTS

| | | | |
|---|---|---|---|
| DE | 10 2009 048 491 A1 | 4/2011 | |
| DE | 102009048491 A1 * | 4/2011 | ........... B60Q 1/1423 |
| DE | 10 2010 043 171 A1 | 12/2011 | |
| WO | WO 2011035882 A2 * | 3/2011 | ........... B60Q 1/1423 |

* cited by examiner

LAMP KIT FOR INSTALLATION IN A MOTOR VEHICLE, AND A MOTOR VEHICLE

The invention relates to a lamp kit, preferably a headlamp kit, for installation in a motor vehicle, and an arrangement with at least two headlamps of a motor vehicle, and a motor vehicle.

Headlamps with LED strips for daytime running lights and/or parking lights are generally known. They are often delivered from the plant with white, single-coloured LEDs. A respective configuration is shown in FIG. 2.

Multicoloured LEDs in headlamps are recently enjoying increasing popularity among car owners. For this purpose, kits are available and the white, monochromatic LEDs supplied as a standard are replaced by multicoloured LEDs. A complete replacement of the wiring has been necessary until now for this purpose. A changeover from parking lights to daytime running lights can no longer be ensured after this exchange.

It is thus the object of the present invention to ensure multicoloured illumination in the headlamps of motor vehicles in which the vehicle is still able to switch between the parking light function and the daytime running light function.

This object is achieved by the present invention by a lamp kit, preferably a headlamp kit, and by an arrangement of head-lamps.

In accordance with the invention, the lamp kit, preferably a headlamp kit, shall be suitable for installation in a vehicle with at least two headlamps, preferably two front head-lamps.

The respective lamp kit comprises at least two light sources for installation in one each of the two lamps, preferably headlamps. The light source can especially preferably be formed as an LED and can be part of an LED strip with a plurality of similar LEDs in an especially preferred way. The strip can also be set in such a way that different LEDs display different colours, e.g. the national colours of the country. The LEDs can also be operated in intermittent operation, e.g. as an alarm signal.

Each of the two light sources is capable of emitting light in at least one first or one second wavelength. The wavelengths are preferably in the visible range of the light. This means that the colour of the light to be emitted by the light source can be set. This is understood within the scope of the present invention as a multicoloured light source.

The first of the at least two multicoloured light sources is or can be connected in accordance with the invention to a first control unit for controlling the wavelength of the light emitted by the first light source. The connection can occur by means of plug contacts for example. The components can be purchased in trade for example as a set of components in a package and can be assembled only during installation in the motor vehicle.

The first control unit is or can be connected in accordance with the invention to a first receiving unit for receiving a signal transmitted wirelessly. It can be provided for example that both elements are arranged on a printed circuit board.

In an analogous manner, the second of the at least two multicoloured light sources is or can be connected in accordance with the invention to a second control unit for controlling the wavelength of the light emitted by the second light source, and the second control unit is or can be connected to the second receiving unit for receiving a signal transmitted wirelessly.

The respective light sources within the headlamp housing can be triggered by the separate control unit and the receivers. An exchange of cables is not necessary during mounting. The daytime running light function can thus be further ensured.

The customer can therefore choose among a plurality of colours and set the intensity at the same time. If the customers therefore wish to use the colour red, they can set a bright red during the day, i.e. with daytime running light, and when the low beam is activated, i.e. with parking light, a weaker red is set. Different colours can also be set, i.e. with white as the daylight running light and green as the parking light.

Advantageous embodiments of the invention are the subject matter of the dependent claims.

It is advantageous that at least the first receiving unit is formed as a wireless access point or as a Bluetooth receiver. A wireless LAN receiver, especially preferably a 2.4 GHz wireless LAN receiver, can preferably be used.

A Bluetooth or RF receiver is possible as an alternative. It preferably concerns a 315, 433 or 868 MHz receiver.

IR, ultrasonic and/or RFID receivers are less preferred, but also possible.

In the case of the wireless LAN receiver or wireless LAN server, the user can access a web page generated by the wireless LAN server and set the colours of the light sources there. This can preferably occur via a mobile device such as a mobile phone or a tablet PC.

In the case of using a Bluetooth receiver, an app on a mobile phone or a tablet PC can be used to control the colour of the light source.

The wireless access point can advantageously comprise a radio module transmitter and the second receiving unit can be formed as a radio module receiver for receiving a radio signal emitted by the radio module transmitter.

The first and the second receiving unit can each be formed alternatively as Bluetooth receivers.

The first and/or the second of the at least two light sources is or can be connected to one or several further light sources.

The light sources can have a maximum lumen output of at least 50 lm, preferably at least 80 lm. As a result, the light source can be operated both in parking light mode or, at a higher lumen output, in daytime running light mode. The light sources can also illuminate a light conductor such as a plexiglass rod.

It is advantageous for the purpose of simple handling during mounting if at least two, especially all, of the following elements are arranged in a single printed circuit board: the first light source, the first control unit, the first receiving unit.

Cables can also be arranged in an alternative but less preferred manner between the receiver, the control unit and the multicoloured light source. It preferably concerns several cables or a multi-core cable, wherein each cable is associated with one colour of the light source. Four cables can thus be provided for example for white, blue, red and yellow.

An arrangement with at least two lamps, preferably headlamps, of a motor vehicle is further provided in accordance with the invention, especially with two front headlamps in a motor vehicle, wherein each lamp comprises at least one light source, wherein each of the two light sources is formed in such a way that the light source can emit light in at least one first or second wavelength, wherein the first of the at least two multicoloured light sources is connected to a first control unit for controlling the wavelength of the light emitted by the first light source, and wherein the first control unit is connected to a first receiving unit for receiving a signal transmitted wirelessly, and wherein the second of the at least two multicoloured light sources is connected to a second control unit for controlling the wavelength of the light emitted by the second light source, wherein the second control unit is connected to a second receiving unit for receiving a signal transmitted wirelessly.

The first control unit, the first light source and the first receiving unit is preferably arranged in a lamp housing of a first one of the two lamps, and accordingly the second light source, the second control unit and the second receiving unit are arranged in a lamp housing of a second one of the two lamps.

The arrangement can advantageously comprise at least one first cable connection for the power supply of the lamps in the daytime running light mode, which connects the first lamp to the second lamp, and wherein the arrangement comprises at least one second cable connection for the power supply of the headlamps in the parking or low beam mode, which connects the first lamp to the second lamp, and wherein the arrangement further comprises a supply cable which connects the first and/or the second cable connection to an ignition of a motor vehicle.

The lamps can each comprise two lamp housings, and the lamp kit in accordance with the invention can be integrated in the arrangement, such that all elements of the lamp kit are integrated in the housing. The components are merely divided among the two lamp housings, so that drilling and sealing of the rear wall of the lamp during mounting can be avoided.

A motor vehicle with an arrangement in accordance with the invention is also according to the invention.

Motor vehicles within the scope of the present invention are motor-operated vehicles, especially motorbikes, motor cars, trucks and the like.

The invention and the generic prior art will be explained below in closer detail by reference to the enclosed drawings, wherein.

The invention relates to the field of vehicle lamps, preferably headlamps. In this field, a differentiation is made between headlamps which fulfil additional functions. Such lamps are lamps for example for parking lights, position lights and/or daytime running lights.

Further lamps which fulfil additional functions are blinkers, brake lights, rear fog lamps, reversing lights, license plate lights or rear lights.

In addition to these lamps which fulfil additional functions, lamps are also known which offer main light functions, which are known as low beam light and high beam light to the person skilled in the art of motor vehicles.

Furthermore, full-LED lamps are also known which both comprise the main light functions and also additional functions such as daytime running light, flashing light and the like.

LED elements are increasingly used in the field of vehicle lamps. They can be used both for the main light function and also for the additional functions. The special advantage of LED lamps over conventional lamps is that they are more durable and two to three times more efficient than light bulbs and emit less thermal radiation. It is thus possible to achieve savings in energy.

Single-colour, mostly white LED elements are used in vehicle lamps with an additional function, especially headlamps with parking light, position light and/or daytime running light.

Daytime running light is vehicle illumination which can only be used when driving during the day and preferably under good visual conditions insofar as the use of other light is not required.

Daytime running lights are used for ensuring a daytime running light function in addition to the lamps that ensure the main light functions. They can be integrated in a full-LED headlamp or attached as a separate headlamp to the vehicle.

Daytime running lights can be formed as low-luminous, low-consumption and durable lamps that have less luminosity than the lamps for the low-beam light, but can burn more intensely than lamps for the parking light, which mostly also represents the low-beam light. The latter are often arranged as end-outline marker lamps in form of LED strips for example.

Figure 2:
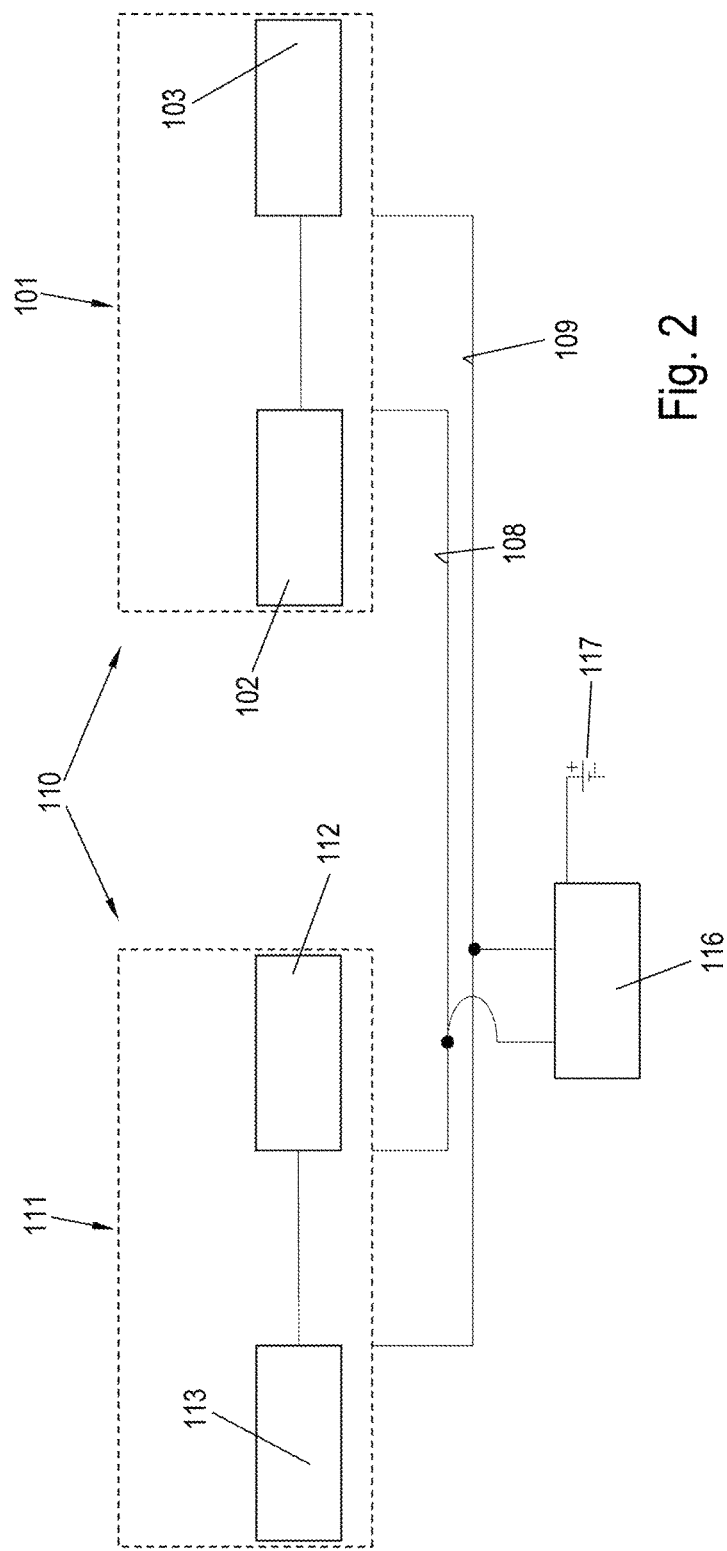
FIG. 2 shows a schematic view of an arrangement of two vehicle headlamps according to the prior art with single-colour illumination.

A typical circuit diagram of such a known vehicle headlamp with LED elements as a daytime running light is shown in FIG. 2.

The illustration shows an arrangement 110 consisting of two headlamps 101 and 111 of a motor vehicle. The power supply for these headlamps 101 and 111 is provided by the car battery. Two light sources 102 and 103 for a first one of the two headlamps 101 and two light sources 112 and 113 for the second one of the two headlamps are arranged in a purely schematic manner in FIG. 2. These LEDs are typically supplied from the factory in white and can be dimmed, so that it is possible to distinguish between a parking light operating mode 108 and a daytime running light operating mode 109. The changeover between these two operating modes occurs mainly by pulse width modulation of a supply voltage.

The situation shown in FIG. 2 represents a conventional case such as when a motor vehicle is delivered to the end customer for example.

For the purpose of improving the optical effect, multicoloured light sources and multicoloured LEDs in particular can be used instead of the white light sources. This can occur at the factory, but in most cases the replacement will be carried out by the user or by garages retroactively in form of a tuning kit.

Figure 3:
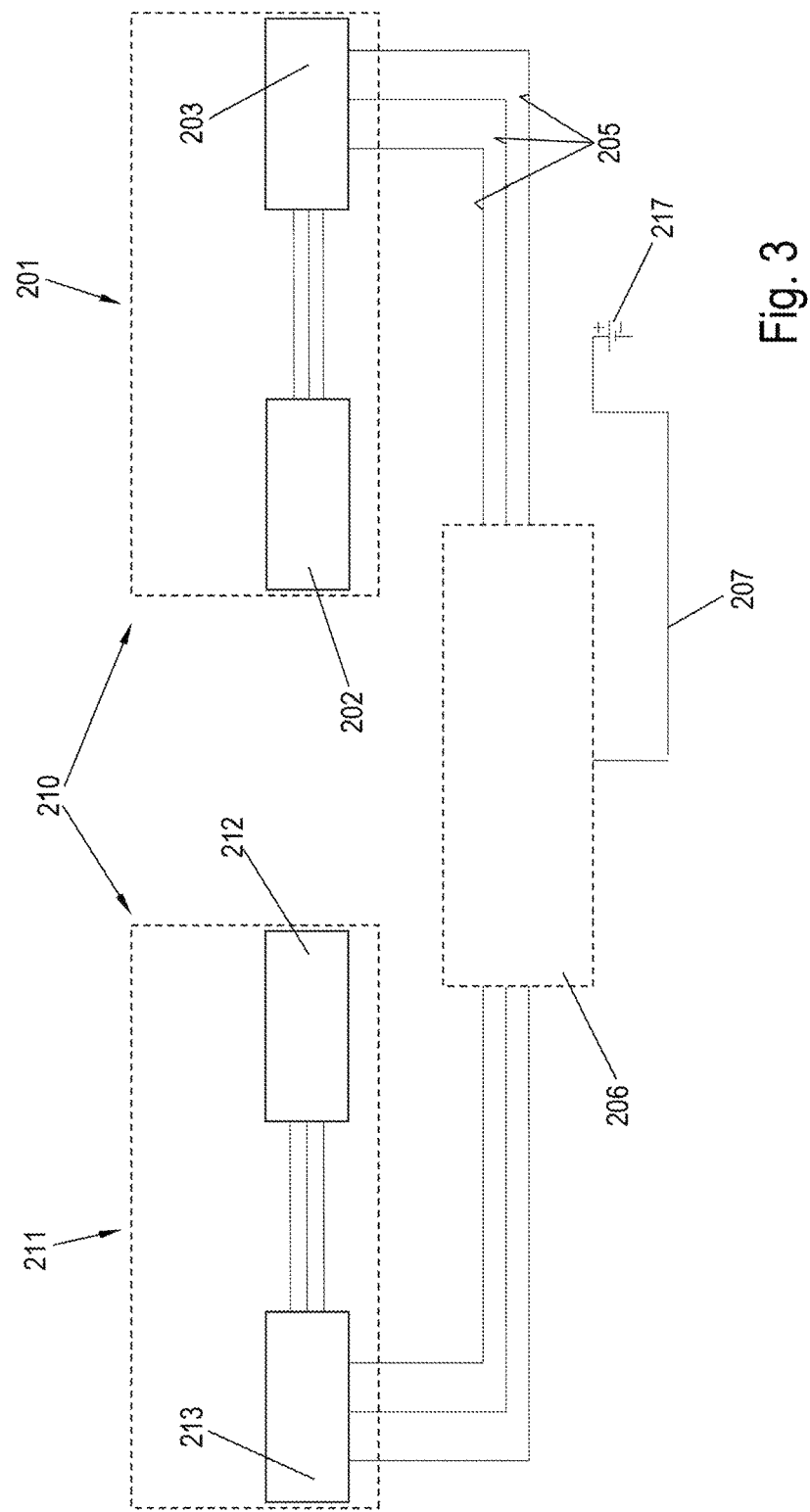
FIG. 3 shows a schematic view of an arrangement of two vehicle headlamps according to the prior art with multicoloured illumination.

FIG. 3 shows a known arrangement 210 with two headlamps 201 and 211. They comprise multicoloured light sources 202, 203, 212, 213, i.e. light sources which are formed in such a way that the wavelength of the emitted light can be varied and set in an especially preferred way. The light source can be triggered in such a way that it emits light in a first and in a second wavelength.

A control unit 206 is additionally provided for setting the wavelength of the light sources 202, 203, 212, 213. It is typically desired that the light sources 202, 203 of the first headlamp 201 emit light with the same wavelengths as the light sources 212, 213 of the second headlamp 211.

The control of the wavelength of the light sources between the headlamps 201 and 211 is carried out in the prior art by a control unit 206, which provides a signal line with respective wiring 205. The white or single-colour lamps that are installed as a standard are usually exchanged for multicoloured lamps. The control unit 206 is usually installed in the engine compartment of the motor vehicle for controlling the colour of the multicoloured light sources, which control unit is coupled to the power supply of the car battery and is supplied with a supply voltage. The cables 205 of the new multicoloured light sources must be guided to said control unit 206 by drilling a hole into the rear wall of the headlamp, which subsequently needs to be sealed again. As already explained above, an additional power supply of the control unit 206 is necessary via a supply cable 207. The control unit 206 can be accessed in different ways.

The function of the daytime running light is no longer provided because the control unit no longer comprises any signal inputs for ignition and therefore cannot distinguish between daytime running light and parking or low-beam light.

Figure 1:
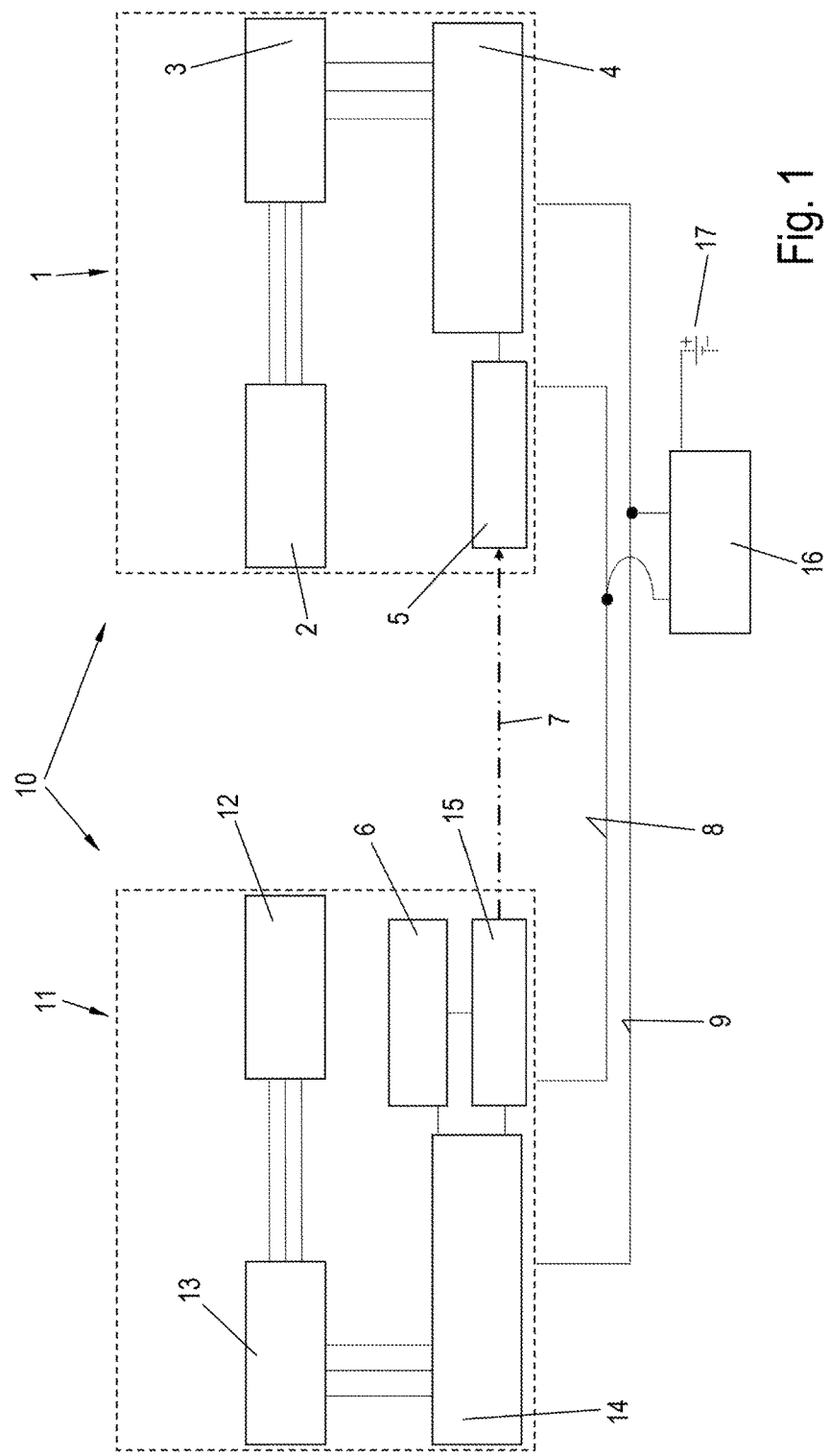
FIG. 1 shows a schematic view of an arrangement in accordance with the invention which comprises two vehicle headlamps.

FIG. 1 now shows an embodiment in accordance with the invention. It shows an arrangement 10 consisting of a first headlamp 1 and a second headlamp 11. Both headlamps 1 and 11 comprise at least one multicoloured light source 2, 3, 12 and 13, especially two or more than two thereof, i.e. light sources which can change between at least two or more wavelengths.

It is understood that the light sources can also change between more than two wavelengths, preferably more than 10 wavelengths. Multicoloured LEDs are especially preferred in this context.

Furthermore, the arrangement 10 in accordance with the invention comprises at least one control unit 4 and 14 in each headlamp 1 and 11. Furthermore, at least one of the two headlamps 1 or 11 comprises a wireless access point 6. Furthermore, the headlamp 11 with the wireless access point 6 comprises a radio module transmitter 15 and the second headlamp 1 comprises a radio module receiver 5. In this configuration, the wiring need not be exchanged between the headlamps as compared to the known arrangement of FIG. 3, but FIG. 1 merely represents an embodiment of the invention. In this embodiment, the wireless access point 6 can be a wireless LAN server. The headlamp SW11 is then triggered at first by a colour code and transmits said code via the radio module transmitter 15 to the radio module receiver 5 of the second headlamp SW1, wherein the user can change the colour setting of the two headlamps via an internet page generated by the control unit 14.

It is also possible to simultaneously trigger both headlamps via other transmission means such as Bluetooth via a mobile phone for example. In this case, the headlamps comprise two Bluetooth receivers.

A typical exchange of the motor vehicles supplied as a standard with single-colour light sources in the headlamps can be carried out as follows. The single-colour light sources are exchanged at first for multicoloured ones. The light sources can advantageously be attached to a circuit board as common electronic modules, e.g. as a printed circuit board, or be distributed alternatively among several assemblies.

The LEDs can preferably emit light in a wavelength range of between 380 nm and 780 nm.

The LEDs can be soldered onto separate circuit boards made of aluminium for improved heat dissipation, but can also be soldered for better handling onto a central circuit board preferably made of aluminium. Other materials such as the circuit board material FR-4 is also suitable, but less preferable.

The control units 4 and 14 for power control for operating the LEDs are preferably situated on a circuit board, preferably the central circuit board which is arranged in the headlamp.

The supply voltages for parking light, daytime running light, blinker etc also mostly arrive in these control units 4 and 14.

All necessary circuit boards can thus be exchanged. The access point 6 and the radio module transmitter 15 are arranged on a circuit board, especially the central circuit board.

The access point can be arranged together with the radio module transmitter 15 either in the headlamp 1 or 11. The access point generates a wireless LAN hotspot and generates a website on which the colour can be selected. This can also occur via Bluetooth and an app.

Only one access point is advantageously required. It is also possible to arrange an access point in each headlamp. This is a less preferred solution because it is more expensive. This can be provided in order to control the headlamps independently from each other. This will also work with only one access point and the colours for each headlamp can then be set separately.

Furthermore, the transmission from headlamp to headlamp can occur both via wireless LAN or via server-client transmission methods or other transmission variants.

The circuit board with access point comprises a radio module in order to transmit the set colour values to the other headlamp. It can also be considered to integrate the radio module directly in the access point and/or to carry out the transmission directly by means of wireless LAN between the two headlamps.

The values selected on a website or in the so-called app are set in the case of change in a microcontroller (not shown) of the headlamp with the access point and is also similarly transmitted to the second headlamp. The microcontroller can be integrated in the control unit for example, especially in the control unit 14. A memory unit can also be provided in the control unit. The values are stored by the microcontroller in the memory unit, e.g. an EEPROM, and then advantageously transmitted via radio to the second control unit 4 and a microcontroller integrated therein.

In summary, no permanent radio connection and no permanent transmission of a radio signal 7 is necessary. As a result, signals for colour control can preferably be transmitted every 10 to 1000 ms, preferably every 100 to 850 ms, irrespective of whether something changes or not. An especially secure connection between the two modules can thus be ensured for example.

The supply with current occurs via the existing lines. An exchange of the wiring is thus not necessary. Since the daytime running light is automatically supplied with current when the ignition is activated, supply is guaranteed at all times.

A respective control device 16, 116 is provided in FIG. 1 and also in FIG. 3 as a part of the ignition of the motor vehicle, which control device is arranged between the lines of the daytime running and parking light 8, 9 and a car battery 17, 117. It is provided as a standard in order to control the intensity of the light sources, especially the LEDs, during changeover between parking and daytime running light mode. However, this control device 16 had to be removed until now in the integration of multicoloured illumination with variable wavelength, as shown in FIG. 2 where the battery 217 is connected via a line 207 directly to a control unit 206 for controlling the wavelengths of the light.

As a result of the arrangement 10 in accordance with the invention, no cables need to be drawn from the headlamps as is a case in FIG. 3 and need to be guided to a control unit 206.

Figure 4:
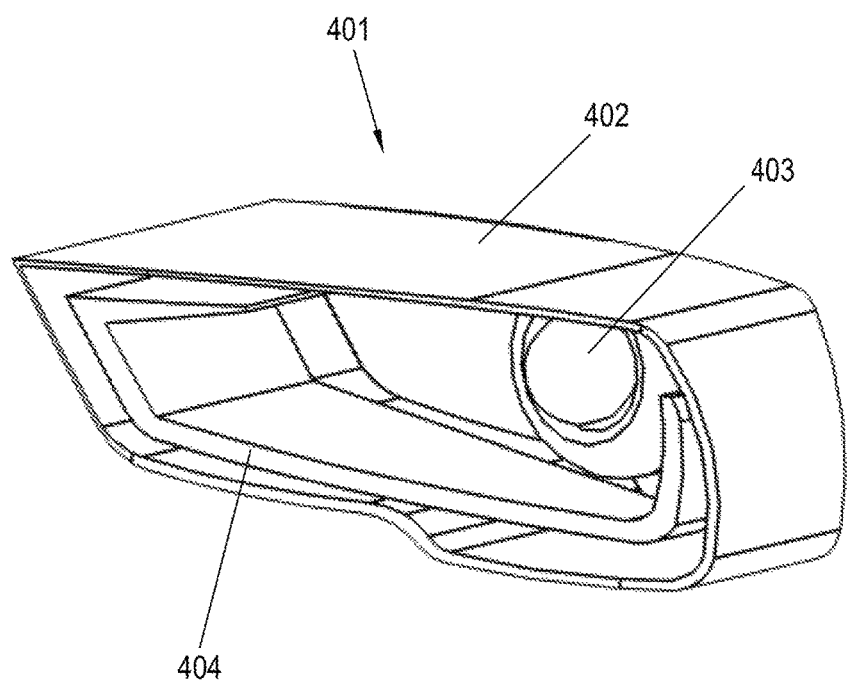
FIG. 4 shows a schematic view of a vehicle headlamp.

FIG. 4 shows a vehicle headlamp 401 in accordance with the invention, comprising a headlamp housing 402, a lamp with a main light function 403 and a multicoloured LED strip arranged therein with alternating daytime running/parking light function 404.

LIST OF REFERENCE NUMERALS 1, 11, 101, 111, 201, 211 Headlamp
2, 12, 102, 112, 202, 212 Light source
3, 13, 103, 113, 203, 213 Light source
4, 14, 207 Control unit
5 Radio module receiver
6 Wireless access point
7 Radio signal
8 Cable connection for parking light
9 Cable connection for daytime running light
10 Arrangement
15 Radio module transmitter
16, 116 Control device
17, 117, 217 Car battery
401 Vehicle headlamp
402 Headlamp housing
403 Lamp with main light function
404 LED strip with alternating daytime running/parking light function

The invention claimed is:

1. An arrangement having at least two lamps of a motor vehicle, each of the lamps comprising a main light source and at least one multicoloured light source, which is a multicoloured LED light source with alternating daytime running/parking light modes, wherein each of the two multicoloured light sources can emit light in at least one first or one second wavelength, the arrangement comprising, at least one first cable connection for the power supply of the lamps in daytime running light mode, which connects a first lamp of the at least two lamps to a second lamp of the at least two lamps, at least one second cable connection for the power supply of the lamps in the parking light or a low-beam light mode, which connects the first lamp to the second lamp, and a supply cable which connects the first and/or the second cable connection to an ignition of a motor vehicle; wherein the ignition comprises a control device which carries out the changeover between the daytime running light and the parking light and which controls the power supply of the main and multicoloured light sources by a car battery, wherein the control device is arranged between the lines of the daytime running lights and parking light and a car battery in order to control the intensity of the LEDs, during changeover between parking and daytime running light mode;

wherein the first of the at least two multicoloured light sources is connected to a first control unit for controlling the wavelength of the light emitted by the first lamp, wherein the first control unit is connected to a first receiving unit for receiving a wirelessly transmitted signal, and wherein the second of the at least two multicoloured light sources is connected to a second control unit for controlling the wavelength of the light emitted by the second lamp, wherein the second control unit is connected to a second receiving unit for receiving a wirelessly transmitted signal;

wherein all elements of the lamps are integrated in a lamp housing wherein at least the first receiving unit is formed as a wireless access point or as a Bluetooth receiver; and wherein the wireless access point comprises a radio module transmitter and the second receiving unit is formed as a radio module receiver for receiving a radio signal emitted by the radio module transmitter.

2. The arrangement according to claim 1, wherein the first and/or the second of the at least two multicoloured light sources can be connected is connectable to several further light sources to form a light strip.

3. The arrangement according to claim 1, wherein the multicoloured light sources have a maximum lumen count of at least 50 lm.

4. The arrangement according to claim 1, wherein at least two of the following elements are arranged on a single circuit board: the first main light source, at least one multicoloured light source, the first control unit, the first receiving unit.

5. The arrangement according to/claim 1 for generating daytime running light and/or parking light in a motor vehicle.

6. A motor vehicle comprising an arrangement according to claim 1.

7. The arrangement according to claim 1, wherein the multicoloured light sources have a maximum lumen count of at least 80 lm.

8. The arrangement according to claim 1, wherein the at least one multicolored light source, the first control unit, and the first receiving unit are arranged on a single circuit board.

* * * * *